United States Patent
Darling et al.

(10) Patent No.: US 10,135,085 B2
(45) Date of Patent: Nov. 20, 2018

(54) FLOW BATTERY WITH HYDRATED ION-EXCHANGE MEMBRANE HAVING MAXIMUM WATER DOMAIN CLUSTER SIZES

(71) Applicant: United Technologies Corporation, Hartford, CT (US)

(72) Inventors: Robert Mason Darling, South Windsor, CT (US); Michael L. Perry, Glastonbury, CT (US); Wei Xie, East Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 80 days.

(21) Appl. No.: 14/891,013

(22) PCT Filed: May 16, 2013

(86) PCT No.: PCT/US2013/041277
§ 371 (c)(1),
(2) Date: Nov. 13, 2015

(87) PCT Pub. No.: WO2014/185909
PCT Pub. Date: Nov. 20, 2014

(65) Prior Publication Data
US 2016/0126579 A1    May 5, 2016

(51) Int. Cl.
*H01M 4/36* (2006.01)
*H01M 8/1067* (2016.01)
(Continued)

(52) U.S. Cl.
CPC ....... *H01M 8/1067* (2013.01); *H01M 8/1023* (2013.01); *H01M 8/1039* (2013.01);
(Continued)

(58) Field of Classification Search
CPC .. H01M 8/1067; H01M 8/188; H01M 8/1023; H01M 8/1039; H01M 8/20
See application file for complete search history.

(56) References Cited

U.S. PATENT DOCUMENTS

| 4,407,902 A | 10/1983 | Kummer et al. |
| 5,318,865 A | 6/1994 | Kaneko et al. |

(Continued)

FOREIGN PATENT DOCUMENTS

| EP | 2856549 | 4/2015 |
| JP | S54-19228 | 7/1979 |

(Continued)

OTHER PUBLICATIONS

European Search Report for European Patent Application No. 13884702 completed Sep. 20, 2016.

(Continued)

*Primary Examiner* — Jimmy Vo
(74) *Attorney, Agent, or Firm* — Carlson, Gaskey & Olds, P.C.

(57) ABSTRACT

A flow battery includes a cell that has a first electrode, a second electrode spaced apart from the first electrode and an electrolyte separator layer arranged between the first electrode and the second electrode. A supply/storage system is external of the at least one cell and includes first and second vessels that are fluidly connected with the at least one cell. First and second fluid electrolytes are located in the supply/storage system. The electrolyte separator layer includes a hydrated ion-exchange membrane of a polymer that has a carbon backbone chain and side chains extending from the carbon backbone chain. The side chains include hydrophilic chemical groups with water molecules attached by secondary bonding to form clusters of water domains. The clusters have an average maximum cluster size no greater than 4 nanometers, with an average number of water molecules per (Continued)

hydrophilic chemical group, λ (lambda), being greater than zero.

19 Claims, 3 Drawing Sheets

(51) Int. Cl.
    *H01M 8/1023*     (2016.01)
    *H01M 8/1039*     (2016.01)
    *H01M 8/20*     (2006.01)
    *H01M 8/18*     (2006.01)
    *H01M 8/1018*     (2016.01)

(52) U.S. Cl.
    CPC ............ *H01M 8/188* (2013.01); *H01M 8/20* (2013.01); *H01M 2008/1095* (2013.01); *H01M 2300/0082* (2013.01); *Y02E 60/528* (2013.01)

(56) References Cited

U.S. PATENT DOCUMENTS

| | | | |
|---|---|---|---|
| 5,648,184 A | | 7/1997 | Inoue et al. |
| 5,830,603 A | * | 11/1998 | Oka ...................... H01M 2/145 204/296 |
| 9,166,243 B2 | | 10/2015 | Perry |
| 2004/0086763 A1 | | 5/2004 | Paddison |
| 2004/0157102 A1 | * | 8/2004 | Andrews ............ B01D 67/0088 429/465 |
| 2005/0244707 A1 | * | 11/2005 | Skyllas-Kazacos ........................ B60L 11/1894 429/105 |
| 2008/0274393 A1 | | 11/2008 | Markoski et al. |
| 2008/0292938 A1 | | 11/2008 | Perry et al. |
| 2009/0136789 A1 | | 5/2009 | Pien et al. |
| 2012/0077079 A1 | * | 3/2012 | Li ........................ H01M 8/188 429/199 |
| 2012/0100461 A1 | | 4/2012 | Iden et al. |
| 2012/0220673 A1 | | 8/2012 | Browning |
| 2012/0238648 A1 | * | 9/2012 | Zhou ........................ B01J 49/00 521/27 |
| 2013/0059229 A1 | * | 3/2013 | Onuma ............... H01M 8/1023 429/492 |
| 2014/0377687 A1 | | 12/2014 | Miyake et al. |

FOREIGN PATENT DOCUMENTS

| | | |
|---|---|---|
| JP | H02-148659 | 6/1990 |
| JP | 2006-156029 | 6/2006 |
| WO | 9003666 | 4/1990 |

OTHER PUBLICATIONS

European Search Report for European Patent Application No. 13883794.3 completed Nov. 8, 2016.
File History for U.S. Appl. No. 13/513,651 now U.S. Pat. No. 9,166,243 issued Oct. 20, 2015.
Certified Translation. Japanese Publication of Examined Patent Application No. S52-102887 published Jul. 13, 1979.
Certified Translation. Japanese Unexamined Patent Application No. H2-148659 published Jun. 7, 1990.
Certified Translation. Japanese Unexamined Patent Application No. 2006-156029 published Jun. 15, 1990.
Linden, D. and Reddy, T.B. Eds. (2002). Handbook of batteries. New York, NY: McGraw-Hill. pp. 37.12, 18-23, 42.3-13, 43.11-3, Appendix A.
Laramini, J. and Dicks, A. (2003). Fuel cell systems explained. Chichester, England: John Wiley & Sons Inc. pp. xv, xvi, 18-9, 88-9, 94-6.
Haar, D. (2016). Dan Haar: United Technologies battery could upend the power business. Hartford Courant. Retrieved Feb. 22, 2017 from: http://www.courant.com/business/dan-haar/hc-haar-united-technologies-battery-for-electric-grid-20160523-column.html.
Aricò, A.S., Cretì, P., Baglio, V., Modica, E., and Antonucci, V. (2000). Influence of flow field design on the performance of a direct methanol fuel cell. Journal of Power Sources vol. 91. 2000. pp. 202-209.
Li, X. and Sabir, I. (2004). Review of bipolar plates in PEM fuel cells: Flow-field designs. International Journal of Hydrogen Energy vol. 30. 2005. pp. 359-371.
Negishi, A. (2003). Redox flow battery. (Certified Translation). Fuel Cells vol. 2(4). 2003. pp. 69-74.
Yi, J.S., and Nguyen T.V. (1996). Abstract: Hydrodynamics of reactant gas in the electrode of PEM fuel cells with inter-digitated flow fields. The Electrochemical Society, Inc. Meeting Abstracts. Fall Meeting, San Antonio, TX. Oct. 6-11, 1996. p. 974-6.
Kazim, A., Liu, H.T., and Forges, P. (1999). Modelling of performance of PEM fuel cells with conventional and interdigitated flow fields. Journal of Applied Electrochemistry vol. 29(12). 1999. pp. 1409-1416.
Wang, L. and Liu, H. (2004). Performance studies of PEM fuel cells with interdigitated flow fields. Journal of Power Sources vol. 13(2). 2004. pp. 185-196.
Guo, S.M. (2005). The simulation of a PEMFC with an interdigitated flow field design. Computational Science 5th International Conference. May 2005. pp. 104-111.
He, W., Yi, J.S., Nguyen, T.V. (2000). Two-phase flow model of the cathode of PEM fuel ceels using interdigitated flow fields. AIChE Journal vol. 46(10). Oct. 2000. pp. 2053-2064.
Nozaki, K., Hamamoto, O., Kaneko, H., and Ozawa, T. (1975). (Certified Translation). Prospect of power storage using redox flow type secondary battery. Electrochemical/Electro-thermal Study Group Material. The Institute of Electrical Engineers of Japan. Nov. 28, 1975. pp. 1-16.
Declaration of Dr. Toru Kato, Ph.D. In re U.S. Pat. No. 9,166,243. Executed Feb. 23, 2017. pp. 1-89.
Prior Art Claim Chart for U.S. Pat. No. 9,166,243.
Ponce de León, C., Frías-Ferrer, A., González-García, Szánto, D.A., and Walsh, F.C. (2006). Redox flow cells for energy conversion. Journal of Power Sources vol. 160. 2006. pp. 716-732.
Negishi, A. (2003). Redox flow battery. Fuel Cells vol. 2(4). 2003. pp. 69-74.
Nozaki, K., Hamamoto, O., Kaneko, H., and Ozawa, T. (1975). Prospect of power storage using redox flow type secondary battery. Electrochemical/Electro-thermal Study Group Material. The Institute of Electrical Engineers of Japan. Nov. 28, 1975. pp. 1-16.
Shigematsu, T. (2011). Redox flow battery for energy storage. SEI Technical Review No. 73. Oct. 2011. pp. 4-13.
Tokuda, N., Kanno, T., Hara, T., Shigematsu, T., Tsutsui, Y., Ikeuchi, A., Itou, T., et al. (2000). Development of a redox flow battery system. SEI Technical Review No. 73. Jun. 2000. pp. 88-94.
Hagedorn, N.H. (1984). NASA redox storage system development project. Final Report. DOE/NASA/12726-24. Oct. 1984. pp. 1-43.
Sumitomo Electric. Redox Flow Battery. Technical Document. Retrieved May 8, 2017 from: http://global-sei.com/products/redox/pdf/redox-flow-battery.pdf.
Petition for Inter Partes Review of U.S. Pat. No. 9,166,243. *Sumitomo Electric Industries, Ltd.*, Petitioner, v. *United Technologies Corporation*, Patent Owner. Filed Feb. 23, 2017.
International Search Report for PCT Application No. PCT/US2013/041277 dated Oct. 3, 2013.

\* cited by examiner

US 10,135,085 B2

FLOW BATTERY WITH HYDRATED ION-EXCHANGE MEMBRANE HAVING MAXIMUM WATER DOMAIN CLUSTER SIZES

BACKGROUND

Flow batteries, also known as redox flow batteries or redox flow cells, are designed to convert electrical energy into chemical energy that can be stored and later released when there is demand. As an example, a flow battery may be used with a renewable energy system, such as a wind-powered system, to store energy that exceeds consumer demand and later release that energy when there is greater demand.

A typical flow battery includes a redox flow cell that has a negative electrode and a positive electrode separated by an electrolyte layer, which may include a separator, such as an ion-exchange membrane. A negative fluid electrolyte (sometimes referred to as the anolyte) is delivered to the negative electrode and a positive fluid electrolyte (sometimes referred to as the catholyte) is delivered to the positive electrode to drive electrochemically reversible redox reactions. Upon charging, the electrical energy supplied causes a chemical reduction reaction in one electrolyte and an oxidation reaction in the other electrolyte. The separator prevents the electrolytes from freely and rapidly mixing but permits selected ions to pass through to complete the redox reactions. Upon discharge, the chemical energy contained in the liquid electrolytes is released in the reverse reactions and electrical energy can be drawn from the electrodes. Flow batteries are distinguished from other electrochemical devices by, inter alia, the use of externally-supplied, fluid electrolyte solutions that include reactants that participate in reversible electrochemical reactions.

SUMMARY

Disclosed is a flow battery that includes at least one cell that has a first electrode, a second electrode spaced apart from the first electrode and an electrolyte separator layer arranged between the first electrode and the second electrode. A supply/storage system is external of the at least one cell and includes first and second vessels that are fluidly connected with the at least one cell. First and second fluid electrolytes are located in the supply/storage system. The electrolyte separator layer includes a hydrated polymeric ion-exchange membrane that has a carbon backbone chain and side chains extending from the carbon backbone chain. The side chains include hydrophilic chemical groups with water molecules attached by secondary bonding to form clusters of water domains. The clusters have an average maximum cluster size no greater than 4 nanometers, with an average number of water molecules per hydrophilic chemical group, λ (lambda), being greater than zero. The average maximum cluster size of no greater than 4 nanometers and the λ (lambda) limit migration of vanadium or iron ions across the hydrated ion-exchange membrane.

In another aspect, the hydrated ion-exchange membrane is a perfluorosulfonic acid membrane that has perfluorinated carbon backbone chain and perfluorinated carbon side chains that terminate in hydrophilic chemical groups. The average number of water molecules per hydrophilic chemical group, λ (lambda), is greater than zero and less than or equal to 22.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
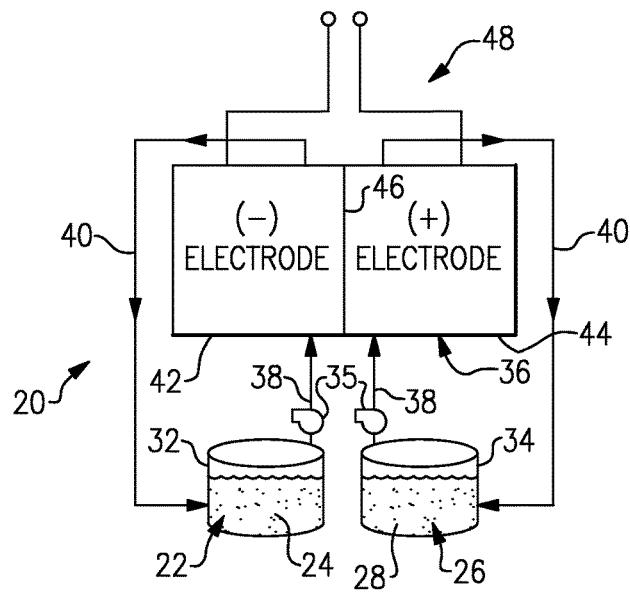
FIG. 1 illustrates an example flow battery.

FIG. 1 schematically shows portions of an example flow battery 20 for selectively storing and discharging electrical energy. As an example, the flow battery 20 can be used to convert electrical energy generated in a renewable energy system to chemical energy that is stored until a later time when there is greater demand, at which time the flow battery 20 then converts the chemical energy back into electrical energy. The flow battery 20 can supply the electric energy to an electric grid, for example.

The flow battery 20 includes a fluid electrolyte 22 that has an electrochemically active species 24 that functions in a redox pair with regard to an additional fluid electrolyte 26 that has an electrochemically active species 28. The electrochemically active species 24/28 are common and are based on ions of vanadium or iron, for example. That is, in one example, the electrochemically active species 24/28 are differing oxidation or valence states of vanadium, and in another example the electrochemically active species 24/28 are differing oxidation or valence states of iron. The fluid electrolytes 22/26 are liquid solutions that include the electrochemically active species 24/28. The first fluid electrolyte 22 (e.g., the negative electrolyte) and the second fluid electrolyte 26 (e.g., the positive electrolyte) are contained in a supply/storage system 30 that includes first and second vessels 32/34 and pumps 35.

The fluid electrolytes 22/26 are delivered using the pumps 35 to at least one cell 36 of the flow battery 20 through respective feed lines 38 and are returned from the cell 36 to the vessels 32/34 via return lines 40. The feed lines 38 and the return lines 40 connect the vessels 32/34 with first and second electrodes 42/44. Multiple cells 36 can be provided as a stack.

The cell 36 includes the first electrode 42, the second electrode 44 spaced apart from the first electrode 42, and a hydrated ion-exchange membrane 46 arranged between the first electrode 42 and the second electrode 44. For example, the electrodes 42/44 are porous carbon structures, such as carbon paper or felt. In general, the cell or cells 36 can include bipolar plates, manifolds and the like for delivering the fluid electrolytes 22/26 through flow field channels to the electrodes 42/44. The bipolar plates can be carbon plates, for example. It is to be understood however, that other configurations can be used. For example, the cell or cells 36 can alternatively be configured for flow-through operation where the fluid electrolytes 22/26 are pumped directly into the electrodes 42/44 without the use of flow field channels.

The hydrated ion-exchange membrane 46 prevents the fluid electrolytes 22/26 from freely and rapidly mixing but permits selected ions to pass through to complete the redox reactions while electrically isolating the electrodes 42/44. In this regard, the fluid electrolytes 22/26 are generally isolated from each other during normal operation, such as in charge, discharge and shutdown states. In one example, the hydrated ion-exchange membrane 46 has a specific conductivity of 0.01 to 0.2 S/cm at 25° C. under 100% relative humidity. In a further example, the hydrated ion-exchange membrane 46 has an average thickness of 25-178 micrometers and is relatively uniform in thickness.

The fluid electrolytes 22/26 are delivered to the cell 36 to either convert electrical energy into chemical energy or, in the reverse reaction, convert chemical energy into electrical energy that can be discharged. The electrical energy is transmitted to and from the cell 36 through an electric circuit 48 that is electrically coupled with the electrodes 42/44.

Figure 2:
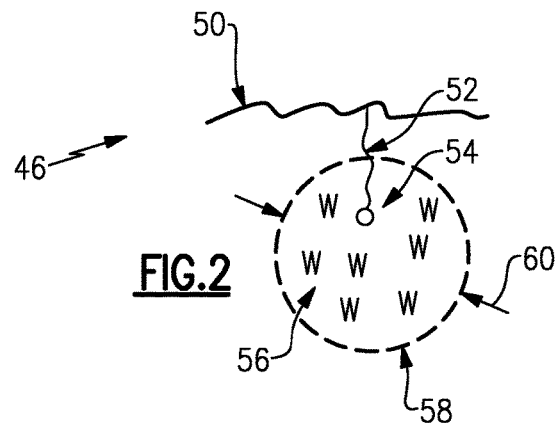
FIG. 2 illustrates a selected portion of polymer of a hydrated ion-exchange membrane.

FIG. 2 schematically illustrates selected portions of a polymer of the ion-exchange membrane 46. The polymer includes a carbon backbone chain, schematically represented at 50 and side chains schematically represented at 52 (one representative side chain shown) that extend from the carbon backbone chain 50. Each of the side chains 52 includes a hydrophilic chemical group schematically represented at 54 with water molecules 56 attached by secondary bonding to the hydrophilic chemical group 54. The hydrophilic chemical group 54 and the attached water molecules 56 form water domains 58 that have an average number of water molecules per hydrophilic chemical group 54, $\lambda$ (lambda), that is greater than zero. For example, $\lambda$ (lambda) is the number of water molecules per hydrophilic chemical group at 30° C. and is less than or equal to 22 or is less than or equal to 14.

Figure 3:
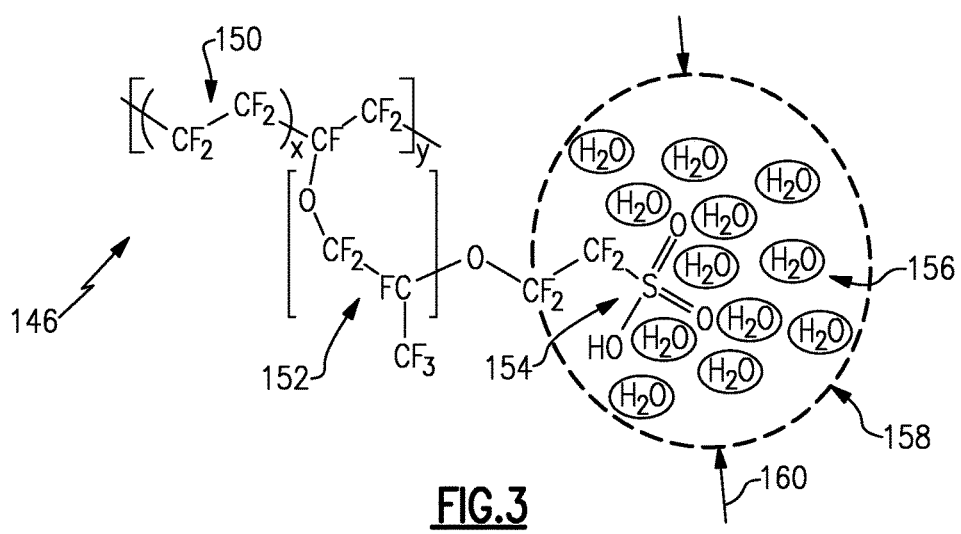
FIG. 3 illustrates another example of a polymer of a hydrated ion-exchange membrane.

FIG. 3 schematically shows another example polymer of an ion-exchange membrane 146. In this disclosure, like reference numerals designate like elements where appropriate and reference numerals with the addition of one-hundred or multiples thereof designate modified elements that are understood to incorporate the same features and benefits of the corresponding elements. In this example, the polymer is or includes perfluorosulfonic acid that has a perfluorinated carbon backbone chain 150 and perfluorinated carbon side chains 152 that terminate in a sulfonic acid group, $—SO_3H$. Water molecules 156 are attached by secondary bonding to the sulfonic acid group 154 to form water domains 158 that have an average number of water molecules per hydrophilic chemical group, $\lambda$ (lambda), that is greater than zero. In a further example, $\lambda$ (lambda) is also less than or equal to 22 or is less than or equal to 14.

Figure 4:
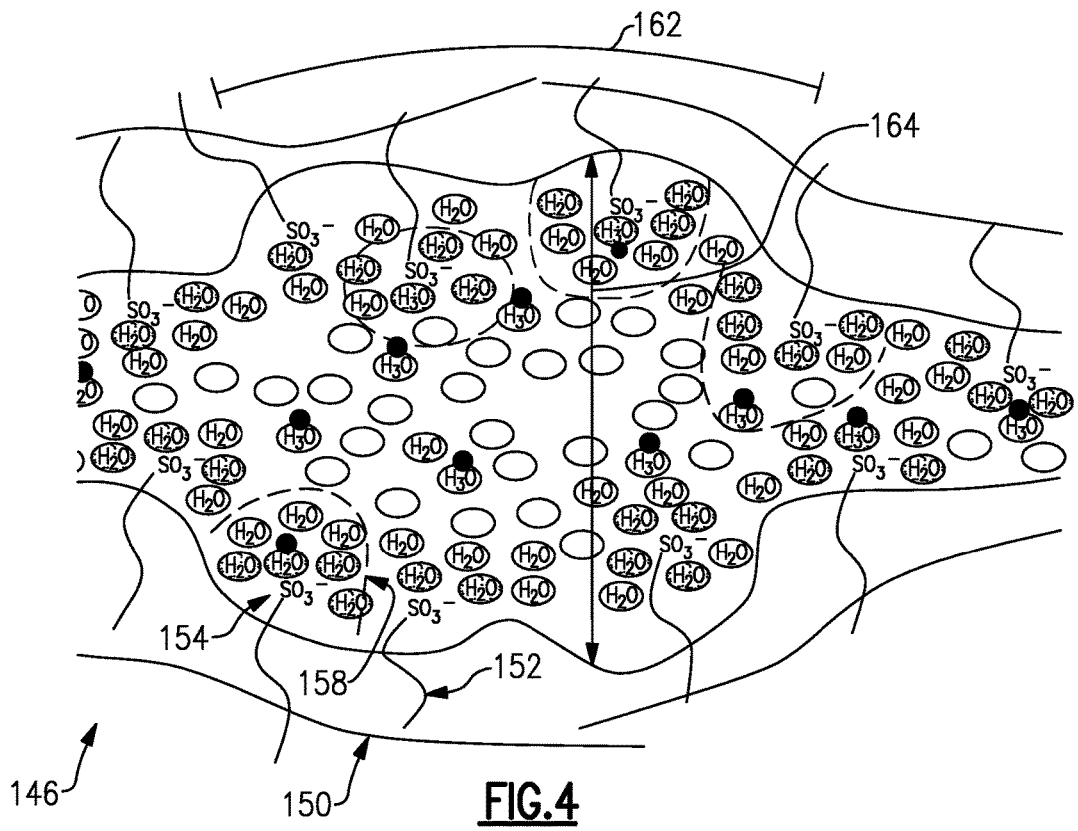
FIG. 4 illustrates another example of a polymer of a hydrated ion-exchange membrane.

As shown in FIG. 4, the water domains 158 (or alternatively 58) form clusters 162 of neighboring water domains 158 that can conduct protons and, if large, allow migration of vanadium or other ions, across the hydrated ion-exchange membrane 146. An average maximum cluster size 164 of the clusters 162 is no greater than 4 nanometers. Without being bound to any particular theory, at low water sorption levels, the domains 58 disperse and separate from each other in the polymer matrix such that the clusters 162 are small or non-existent. When water sorption levels are higher, the size and concentration of the water domains 58 increase to a certain level and form the clusters 162. Relatively small hydrophilic channels can form between two adjacent clusters 162. The size of the channels can be 1 nanometer or smaller.

For vanadium and other electrochemically active species, there can be a trade-off in a flow battery between conductivity across the ion-exchange membrane and selectivity with respect to ions (e.g., vanadium ions) migrating through the ion-exchange membrane. That is, high conductivity is desired to conduct protons through the ion-exchange membrane and high selectivity is desired to prevent migration of the vanadium or other electrochemically active specie ions through the ion-exchange membrane.

The selected average maximum cluster size 164 with $\lambda$ (lambda) greater than zero of the ion-exchange membrane 46/146 provides a relatively high conductivity and relatively high selectivity that is designed for the flow battery 20. Furthermore, the design of the ion exchange membrane 46/146 for the flow battery 20 can essentially be "locked in" because the flow battery 20 operates at a design operational temperature that is below the glass transition temperature of the wet polymer of the ion-exchange membrane 46/146. For example, fuel cells, which utilize two gaseous reactants (e.g., air and hydrogen), typically operate at temperatures that exceed the glass transition temperature of their ion-exchange membranes. Thus, the operational temperature in a fuel cell dictates the polymeric structure by essentially thermally erasing any prior polymeric structure that may have resulted from processing of the ion-exchange membrane. However, in the flow battery 20 that has a design operating temperature below the glass transition temperature of the wet ion-exchange membrane 46/146, the structure of the polymeric ion-exchange membrane is retained and can thus be designed, as disclosed herein, for use in the flow battery 20 with regard to having good conductivity and selectivity.

The average maximum cluster size 164 no greater than 4 nanometers, with an average number of water molecules per hydrophilic chemical group, $\lambda$ (lambda), provides a relatively small size of the clusters 162 and is operable to prevent or reduce migration of the electrochemically active species, such as vanadium, across the hydrated ion-exchange membrane 46/146. Vanadium or other electrochemically active species can migrate through the channels and clusters 162 if they are too large in a flow battery application. Thus, the hydrated ion-exchange membrane 146 provides good conductivity and good selectivity with regard to the electrochemically active species in the flow battery 20.

The hydrated ion-exchange membranes herein can be fabricated using various techniques. As an example, the formation of an ion-exchange membrane having a perfluorinated or non-perfluorinated carbon backbone and perfluorinated or non-perfluronated carbon side chains to provide a base, starting membrane is known and therefore not described in further detail herein. Typically, a perfluorinated membrane is cast or extruded, and boiled in a 3% solution of $H_2O_2$ for about one hour to remove residue monomers and solvents, boiled in 0.5M $H_2SO_4$ solution for about one hour to obtain a fully acidized form of the polymer. The membrane can be further boiled in deionized water for about one hour to remove any residue of the sulfuric acid. In this initial state, absent any further processing, the membrane does not have a $\lambda$ (lambda) of less than or equal to 22 and an average maximum cluster size of no greater than 4 nanometers. The membrane is thus further processed to provide the disclosed $\lambda$ (lambda) of less than or equal to 22 and an average maximum cluster size of no greater than 4 nanometers using any or all of the below-described techniques. The cluster sizes and $\lambda$ (lambda) can be determined experimentally using small-angle X-ray scattering techniques, nuclear magnetic resonance techniques and differential scanning calorimetry techniques.

In one example, the membrane is perfluorosulfonic acid polymer and can be annealed below its glass transition temperature. For instance, the membrane is annealed at a temperature of 80°-100° C. for 24 hours. The annealing reduces extra free volume in the membrane and thus shrinks the average maximum cluster sizes. The annealing also frees water and thus can be used to reduce λ (lambda). The annealing will also reduce proton conductivity but will increase selectivity with respect to the electrochemically active species, such as vanadium ions.

Alternatively or additionally, the membrane is perfluorosulfonic acid polymer and can be processed at a temperature below its melting temperature and above its glass transition temperature to decrease free volume and increase crystallinity. In one example, the ion-exchange membrane is treated at a temperature of 120°-140° C. Such a treatment reduces the average maximum cluster size and decreases λ (lambda). The increase in crystallinity also serves to "lock in" the polymeric structure, making the membrane more resistant to changes in the average cluster size and λ (lambda).

Additionally or alternatively, the membrane is perfluorosulfonic acid polymer and can be physically altered, such as by stretching, to further increase crystallization. For example, the membrane is extruded through an orifice that generates tensile stresses on the membrane and thus aligns the polymeric chains to achieve a higher level of crystallinity.

Additionally or alternatively, the polymer of the membrane is perfluorosulfonic acid polymer and can be cured at a higher temperature during fabrication. Curing at higher temperatures induces a higher level of crystallinity. In one example based upon the polymeric structure shown in FIG. 3, the polymer is cured at a temperature of 120° C., 135° C., 150° C. or 165° C.

Additionally or alternatively, the polymeric structure is perfluorosulfonic acid polymer and can be altered to provide a higher equivalent weight ("EW"), which is the weight in grams of the polymer required to neutralize one mole of a base and can be represented in units of grams or commonly as "g/eq." Typical perfluorosulfonic acid polymers have an EW of about 1100. However, the EW can be increased to 1200, 1400 or 1500 to thus decrease the hydrophilic domain concentration in the polymer matrix and thereby reduce the average maximum cluster size. In one example, the polymer has an equivalent weight of 800 g/eq or greater to provide the polymer with λ (lambda) of less than or equal to 22 and an average maximum cluster size of no greater than 4 nanometers.

Additionally or alternatively, the side chains of the polymer include five carbon atoms or less to provide the polymer with λ (lambda) of less than or equal to 22 and an average maximum cluster size of no greater than 4 nanometers. As shown in Table 1 below, for similar equivalent weight, vanadium permeability and proton conductivity trend lower for polymers with shorter side chains (i.e., few carbon atoms) because shorter side chains form smaller hydrophilic clusters. For example, NAFION has five carbon atoms with a side chain structure similar to that shown in FIG. 3, and 3M PFSA has four carbon atoms similar to the side chain structure shown in FIG. 5.

TABLE 1

Conductivity and Permeability of PFSA

| Membrane | Proton Conductivity (mS/cm), 25° C., RH = 100% | $VO^{2+}$ Permeability × $10^7$ ($cm^2$/min) 25° C. | Selectivity × $10^{-4}$ (S min/$cm^3$) |
|---|---|---|---|
| Nafion PFSA 1 Equivalent Weight = 1100 | 74.9 ± 1.1 | 1.89 ± 0.06 | 40 |
| Nafion PFSA 2 Equivalent Weight = 1100 | 65.6 ± 1.7 | 1.45 ± 0.13 | 45 |
| 3M PFSA Equivalent Weight = 1000 | 64.6 ± 4.8 | 1.37 ± 0.02 | 47 |
| 3M PFSA Equivalent Weight = 1200 | 31.8 | 1.02 ± 0.03 | 31 |

Figure 5:
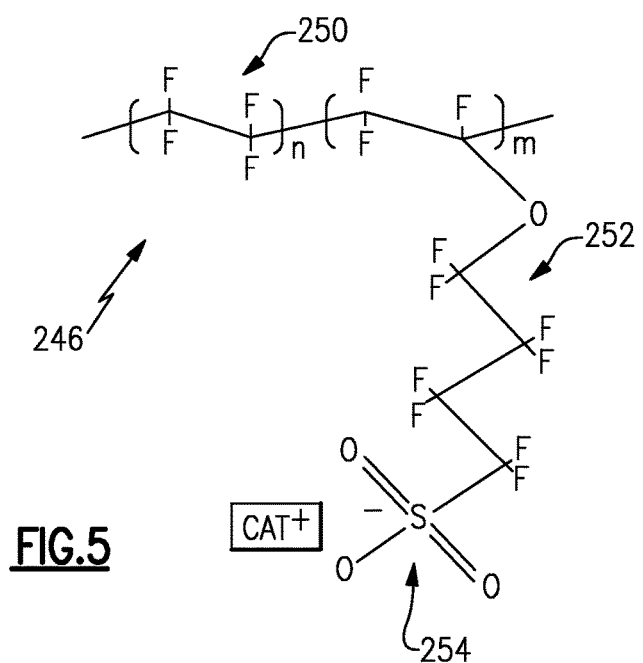
FIG. 5 illustrates another example of a polymer of a hydrated ion-exchange membrane.

Additionally or alternatively, as schematically shown in FIG. 5, the ion-exchange membrane 246 includes cations (one representative cation shown) ionically bonded to negative (electric polar moment) hydrophilic chemical groups 254. For example, the cation is selected from lithium, sodium, potassium, rubidium, cesium and combinations thereof. In particular, potassium, rubidium, cesium and combinations thereof have low hydrophilicity and thus cause a lower amount of water molecules to attach to the hydrophilic chemical group 254, which results in lowering λ (lambda) and lowering the average maximum cluster size. The cations can be introduced into the polymer by boiling the membrane in a solution that includes the cations. For example, the membrane can be boiled in a 1M sodium-hydroxide or potassium-hydroxide solution for approximately one hour, followed by boiling in deionized water for one hour to incorporate either sodium or potassium into the membrane. Other cations can be incorporated using a similar technique. The membrane can then be annealed above its glass transition temperature, such as at 160° C. for approximately six hours. Additionally or alternatively, the ion-exchange membrane can include anions ionically bonded to positive (electric polar moment) chemical groups. For example, the anions can include chlorine and the positive chemical groups can include amine groups, $NR_2$, wherein at least one R is a non-hydrogen, such as an alkyl or aryl group. In another example, the amine groups can be ammonium groups.

Figure 6:
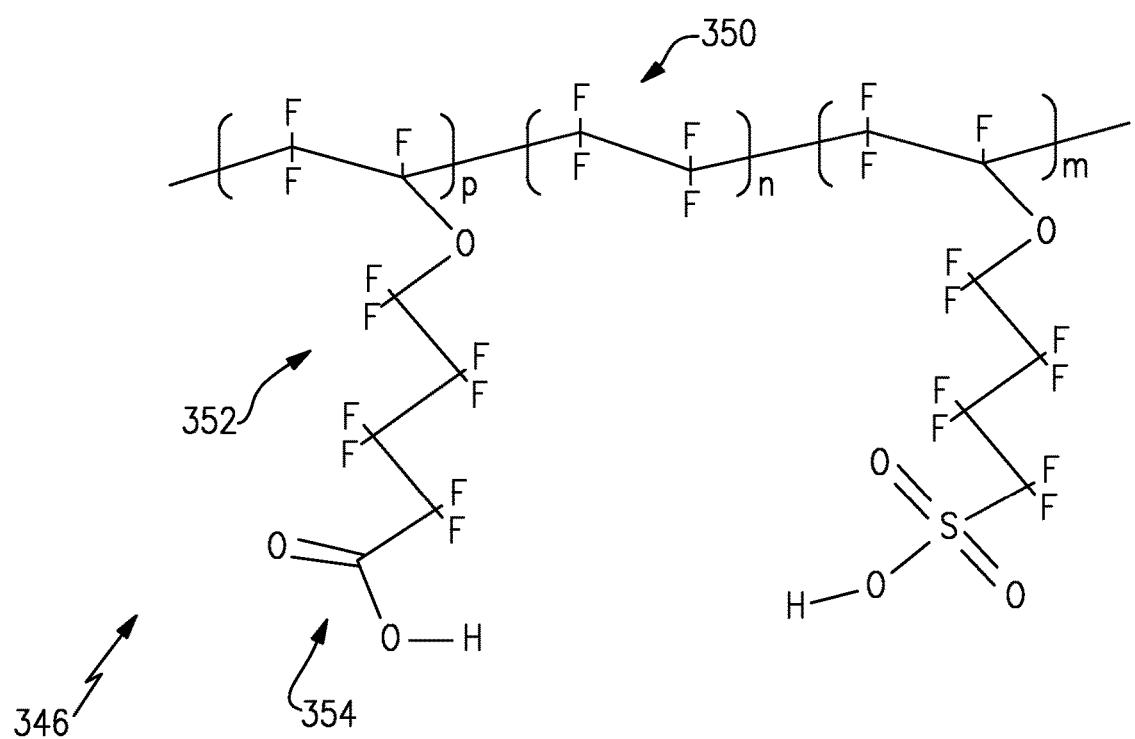
FIG. 6 illustrates another example of a polymer of a hydrated ion-exchange membrane.

Additionally or alternatively, as shown in FIG. 6, the hydrophilic chemical group 354 can be a carboxylic acid group, —COOH. The ion-dipolar interactions of carboxylic acid groups are weaker than sulfonic acid groups and thus provide relatively smaller average maximum domain sizes. Additionally, the carboxylic acid groups permit higher levels of crystallinity than sulfonic acid groups. For example, the polymer structure as shown in FIG. 3 may have a level of crystallinity of 12%, by weight, and the polymeric structure shown in FIG. 6 may have a crystallinity of 18%, by weight.

Additionally or alternatively, the ion-exchange membrane is cross-linked and thus has cross-link chains attached at opposed ends to carbon backbone chains to provide the polymer with λ (lambda) of less than or equal to 22 and an average maximum cluster size of no greater than 4 nanometers. The cross-linking constrains the movement of the chains and thus decreases swelling of the membrane in electrolyte solution. This results in less water uptake and smaller average maximum cluster size. A cross-linked ion-exchange membrane also has lower vanadium permeability and lower proton conductivity than a non-crosslinked analog. In one example, the cross-linked ion-exchange membrane is polysulfone. One example polysulfone ion-exchange membrane is New SELEMION (Type II-b, thickness of 140, provided by Asahi Glass). The polysulfone is cross-linked by accelerated electron radiation. For instance, the accelerated electron radiation is conducted with avoltage of 150 keV, a current of 30 mA and a conveyer rate of 30 rn/min (25 kGy or 2.5 Mrad/pass). In further examples, the cross-linking was conducted under doses of 5, 15, 20 and 40 Mrad. Current efficiency and energy efficiency increase when using cross-linking polymer.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A flow battery comprising:
   at least one cell including a first electrode, a second electrode spaced apart from the first electrode and an electrolyte separator layer arranged between the first electrode and the second electrode;
   a supply/storage system external of the at least one cell, the supply/storage system including first and second vessels fluidly connected with respective first and second flow fields; and
   first and second fluid electrolytes in the supply/storage system,
   wherein the electrolyte separator layer includes a hydrated perfluorosulfonic acid ion-exchange membrane of a polymer comprising a perfluorinated carbon backbone chain and perfluorianted carbon side chains extending from the perfluorinated carbon backbone chain, the perfluorinated carbon side chains terminating in hydrophilic chemical groups with water molecules attached by secondary bonding thereto to form clusters of water domains, the clusters having average maximum cluster sizes no greater than 4 nanometers, with an average number of water molecules per hydrophilic chemical group, λ (lambda), being greater than zero and less than or equal to 22, the average maximum cluster size of no greater than 4 nanometers and the λ (lambda) limiting migration of vanadium or iron ions across the hydrated ion-exchange membrane.

2. The flow battery as recited in claim 1, herein the hydrophilic chemical groups are sulfonic acid groups, —$SO_3H$.

3. The flow battery as recited in claim 1, herein the polymer includes perfluorosulfonic acid.

4. The flow battery as recited in claim 1, herein the hydrophilic chemical groups are carboxylic acid groups, —COOH.

5. The flow battery as recited in claim 1, herein the hydrophilic chemical groups are terminal end groups of the side chains.

6. The flow battery as recited in claim 1, wherein the hydrated ion-exchange membrane has a specific conductivity of 0.01 to 0.2 S/cm.

7. The flow battery as recited in claim 1, wherein the hydrated ion-exchange membrane has an average thickness of 25-178 micrometers.

8. The flow battery as recited in claim 1, wherein the first and second fluid electrolytes include an electrochemically active species of vanadium.

9. The flow battery as recited in claim 1, wherein the hydrated ion-exchange membrane includes at least one of cations and anions bonded to the hydrophilic groups.

10. The flow battery as recited in claim 9, Wherein the hydrated ion-exchange membrane includes cations, the cations are selected from the groups consisting of lithium, sodium, potassium, rubidium, cesium and combinations thereof.

11. The flow battery as recited in claim 9, wherein the hydrated ion-exchange membrane includes cations, the cations are selected from the groups consisting of potassium, rubidium, cesium and combinations thereof.

12. The flow battery as recited in claim 9, wherein the hydrated ion-exchange membrane includes anions, the anions including chlorine.

13. The flow battery as recited in claim 1, wherein the hydrated ion-exchange membrane has a percent crystallinity of at least 6%.

14. The flow battery as recited in claim 1, wherein a maximum design operating temperature of the hydrated ion-exchange membrane is below the glass transition temperature of the polymer.

15. The flow battery as recited in claim 1, wherein the side chains each include 5 or fewer carbon atoms.

16. The flow battery as recited in claim 1, wherein the polymer has an equivalent weight of 800 g/eq or greater.

17. The flow battery as recited in claim 1, wherein the polymer is cross-linked.

18. The flow battery as recited in claim 1, wherein the hydrophilic chemical groups include, respectively, an anion group bonded with a positive chemical group.

19. The flow battery as recited in claim 18, wherein the positive chemical group is an amine group.

* * * * *